Figure 1:
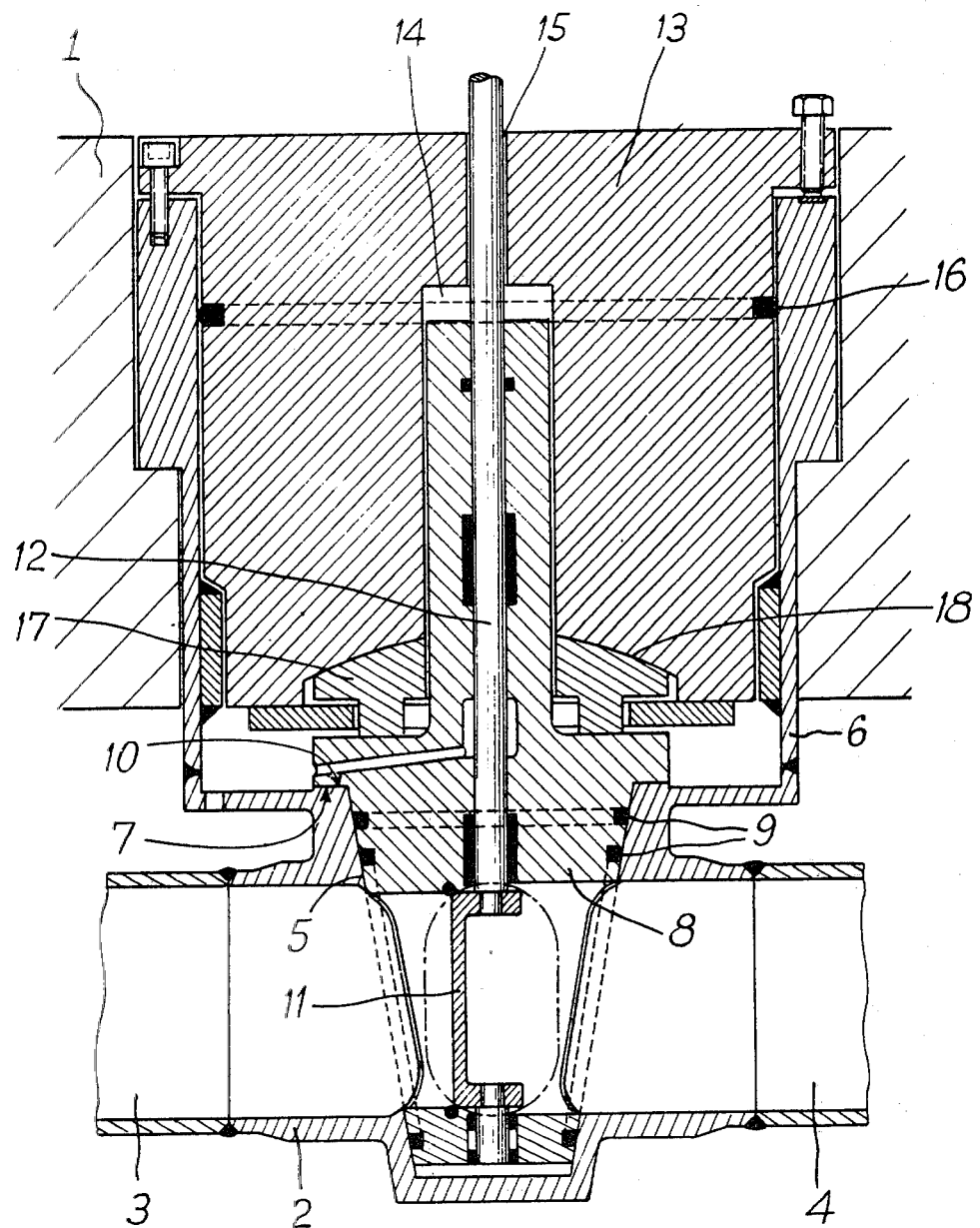

United States Patent [19]

Tucoulat

[11] 4,306,583
[45] Dec. 22, 1981

[54] REMOTELY DISMOUNTABLE VALVES

[75] Inventor: Daniel Tucoulat, La Frette-sur-Seine, France

[73] Assignee: Societe Generale pour les Techniques Nouvelles S.G.N., Montigny-Le-Bretonneux, France

[21] Appl. No.: 106,908

[22] Filed: Dec. 26, 1979

[30] Foreign Application Priority Data

Jan. 3, 1979 [FR] France ................. 79 00097
Oct. 26, 1979 [FR] France ................. 79 26686

[51] Int. Cl.³ .................. F16K 27/00; F16K 1/32
[52] U.S. Cl. .................. 137/454.6; 137/356;
251/269; 251/305; 251/335 B
[58] Field of Search ............ 137/356, 357, 358, 454.6;
251/269, 305, 335 B

[56] References Cited

FOREIGN PATENT DOCUMENTS 1507204 11/1967 France ............................ 137/356

*Primary Examiner*—Gerald A. Michalsky
*Attorney, Agent, or Firm*—Shenier & O'Connor

[57] ABSTRACT

The present invention relates to novel remotely dismountable valves comprising a valve body welded to the pipes and having a truncated seat, an outwardly truncated member fitting on said seat, an obturator whose movements may be remotely controlled due to an extension element and a heavy element made fast with the member via a cross-piece presenting an upper surface in the form of a segment of a sphere on which surface the likewise spherical surface of the lower face of said heavy element abuts.

3 Claims, 3 Drawing Figures

REMOTELY DISMOUNTABLE VALVES

The present invention relates to novel remotely dismountable valves.

For nuclear installations treating highly radioactive and very toxic fluids, for example for the retreatment of irradiated combustibles, the whole of the apparatus is surrounded by protecting screens which stop the radiations and prevent the dissemination of radioactive and toxic aerosol gases in the zone where the personnel is working. Moreover, to facilitate the operations for maintenance of this apparatus enclosed in a cell, the equipment must have a dead volume of retention which is zero or as little as possible, and precautions are taken to limit as much as possible the contamination of the outer walls of the apparatus that it contains. The apparatus and in particular the tanks are, for example, entirely closed and their vents are connected by hermetic pipes to installations for monitoring and treating the gaseous effluents and, to eliminate the risks of leakage, no flange assembly is, as a general rule, allowed.

The levels of radioactivity of toxicity reached often prohibit any approach of the apparatus for operations of maintenance in the cell. The sensitive members, such as valves, pumps, or components thereof which are subject to wear and tear during operation, must then be remotely dismantled or positioned, and extracted from the cell or introduced therein by means of mobile operation enclosures, or "lead castles", which ensure the permanent biological protection of the personnel.

French Pat. No. 1 344 957, its Addition No. 88 688 and Patent Application No. 76 24748 filed on Aug. 13, 1976, describe a self-priming centrifugal pump which is specially designed as a function of these imperatives.

Moreover, French Pat. No. 1 507 204 describes devices allowing on the one hand the remote control of a valve for fluids and, on the other hand, the dismantling of this valve in order to extract it—with a view to repairing it, for example—from an enclosure in which it is disposed. The device recommended in said French Pat. No. 1 507 204 consists in disconnecting the valve assembly from the fluid inlet and outlet pipes, so as to be able to remove the whole of the valve from the enclosure (body and obturation device assembly . . . ).

The valve according to the present invention is characterised in that the body of said valve is permanently welded on the pipes in which the dangerous fluid circulates, thus eliminating any connection of the valve to the pipes by sealed junctions, the obturation device assembly of said valve constituted by a fixed or static member and its accessories is remotely dismountable by traction on a rod which may extract said assembly from the radioactive enclosure to conduct it to a "lead castle".

The obturation device assembly is generally composed of four parts:

an obturating stopper, a fixed or static member, whose outer form is truncated, cooperating externally with the interior of the valve body and internally with the movable part of the obturation device, one or more fixed or static cross-pieces, the top part of the upper cross-piece cooperating with the lower surface of the stopper closing the opening made in the radioactive enclosure, a mobile obturator cooperating with the member.

The invention is particularly applicable in the case of valves in which the displacement of the mobile obturator is effected by translation (globe valve or piston valve), in the case of valves in which the displacement of the obturator is effected by rotation (butterfly valve or plug valve) and in the case of valves in which the obturator is displaced by the combination of a rotation and a translation.

The valves according to the invention generally require that the body of the valve is suitably positioned with respect to the opening made in the enclosure. This device for positioning the body of the valve is advantageously constituted by a positioning sleeve which is welded to the valve body, which is inserted in said opening in the enclosure and which generally rests on a shoulder suitably provided in said opening.

Thus, the body of the valve will be welded to the pipe in which the dangerous fluid—liquid or gas—must circulate; this body will be constituted by an upwardly widening truncated seat of vertical axis and of which the angle is greater than the angle of jamming of the cone. This body will be positioned beneath the opening made in the protecting enclosure and this positioning will advantageously be obtained due to a sleeve entering in said opening and resting on a shoulder in said opening.

Figure 2:
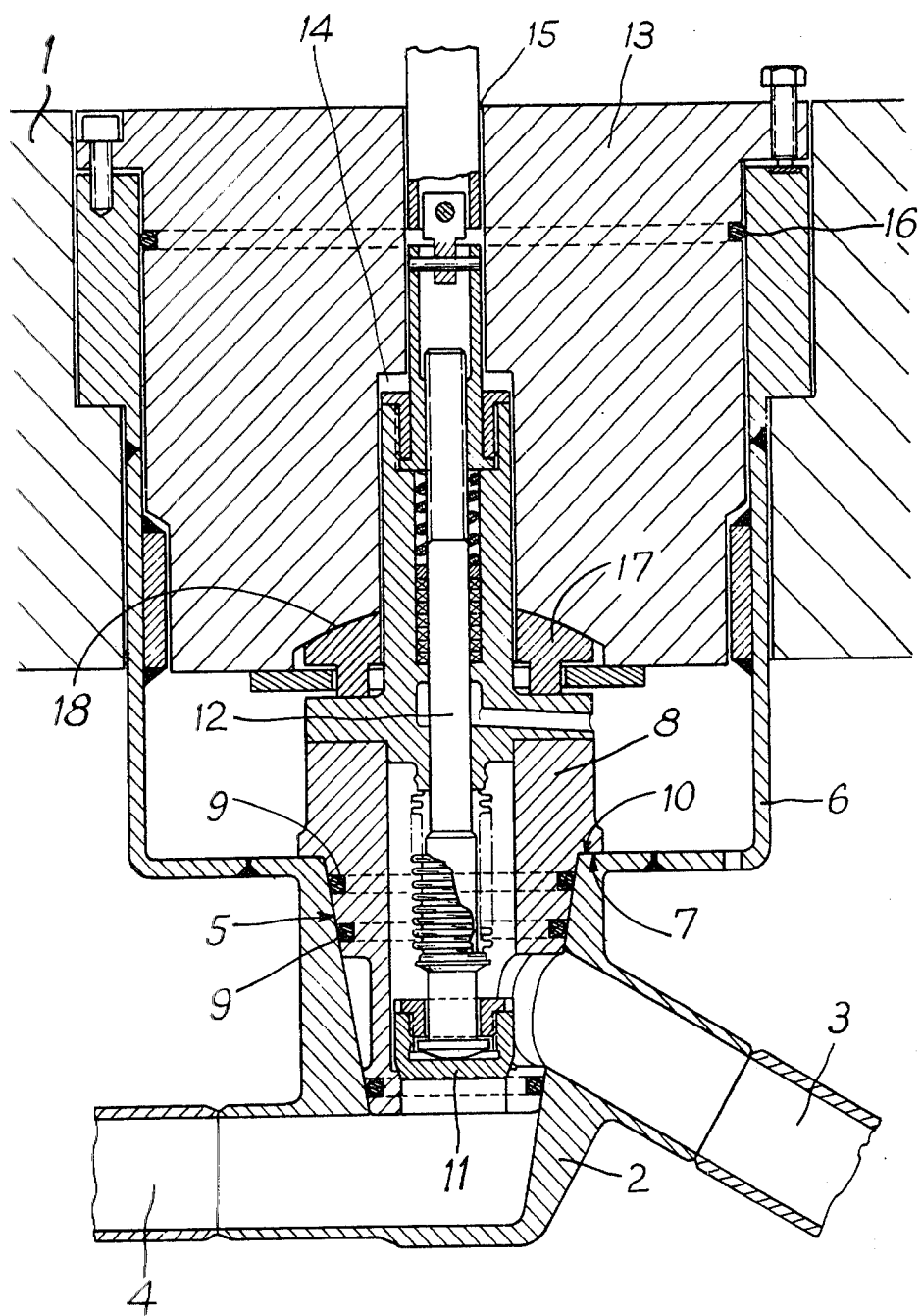
Figure 3:
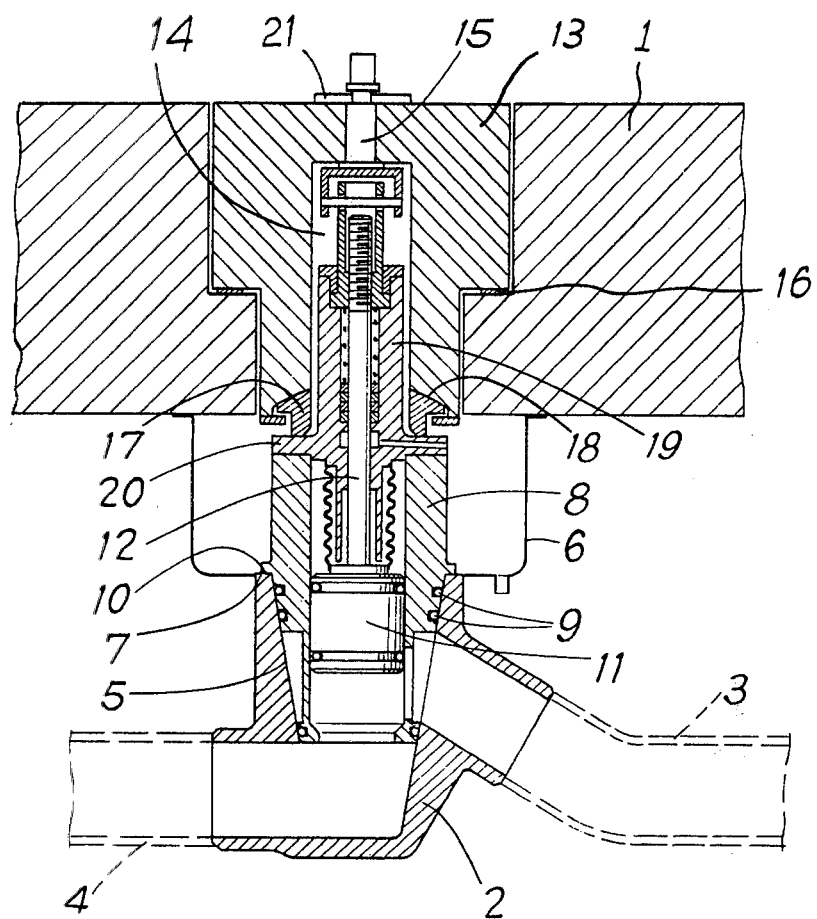

The invention will be more readily understood on reading the following description with reference to the accompanying drawings, in which:

FIGS. 1 to 3 are sections through a butterfly valve and through a globe valve, respectively.

Referring now to the drawings, these Figures show:

at 1, the ceiling of the biological enclosure in which the valve according to the invention is located;

at 2, the body of the valve; as shown, the seat of this valve body is located immediately below an opening made in the ceiling of the biological enclosure; this valve body is welded to the pipes 3 and 4 in which the dangerous fluid—liquid or gas—circulates; this body presents an upwardly widening truncated seat 5 of vertical axis, on the valve body, there has been welded a sleeve 6 adapted to position this body with respect to the opening made in the ceiling of the enclosure; the body of the valve presents in its upper part a stop surface 7. In FIGS. 1 and 2, the sleeve 6 is chosen so as to be able to be inserted in the opening made in the enclosure and presents in its upper part an enlarged portion coming into abutment on a shoulder made in said opening. In FIG. 3, this sleeve 6 is constituted by a sort of bowl which is applied against the lower face of the enclosure.

at 8, a member of which the outer lower part is truncated in form, suitable for cooperating with the truncated cone of the seat of the body of the valve; this lower part of the member is provided with seals 9 fast with said member during dismantling; in the case of a butterfly valve, one of the seals 9 will preferably be disposed around the fluid inlet and outlet pipes and the other seal disposed around said member with respect to the vertical axis thereof; in the upper part of this truncated bearing surface, the member comprises on its periphery a stop surface 10 which abuts on the stop surface 7 of the valve body, whilst allowing the seals 9 to ensure the desired tightness.

at 11, the obturator either of the rotating type (butterfly for FIG. 1) or of the translating type (FIGS. 2 and 3); the obturator is provided, in its upper part, with a rod 12 allowing the said obturator to be controlled and being extended outside the enclosure by an extension element possibly having articulations.

at 13, a heavy stopper having in its axis a housing 14 and a passage 15 for the extension of the rod of the obturator; this stopper obturates the opening made in the biological enclosure with the aid of seals such as 16 (seals cooperating either with the enclosure itself or with the sleeve 6);

at 17, a cross-piece having an outer surface 18 in the form of a segment of a sphere which cooperates with a corresponding spherical surface made in the lower part of the stopper 13 (around the lower part of the central housing 14); this segment of sphere enables the stopper to ensure a suitable pressure on the member 8 even if the axis of said stopper is not in exact alignment with the axis of the body or the member.

Finally, the existence is noted:

on the one hand, wherever this is necesssary, of gaskets and stuffing boxes ensuring the necessary tightness;

on the other hand of channels enabling the possible leakages and drips which may be produced either during functioning or in the course of dismantling of the member 8, to be evacuated, if necessary.

In the valves according to the invention, the heavy stopper acting by its own weight and/or by a controlled outside pressure, brings, via the cross-piece and the sleeve, the stop surface of the member 8 into contact with the stop surface of the valve body, this leading to a controlled crushing of the seals carried by the outer lower part of the member against the seat of the valve body. In this position, the valve is ready to function, its opening and closure being effected by a suitable movement of the obturator obtained by action on the end of the rod projecting from the stopper. When the valve is to be dismantled, a traction on the stopper provokes the outward drive of the obturation device assembly composed of the member, the mobile obturator, the stopper and the cross-piece or cross-pieces.

What is claimed is:

1. A remotely dismountable valve assembly for use with a dangerous fluid circulating pipe disposed within a biological enclosure formed with an opening providing access to said pipe, said assembly comprising a valve body welded to said pipe, said body presenting an upwardly widening truncated seat having a vertical axis, means for precisely positioning said body with respect to said opening with said seat, an upper stop face formed on said valve body, a member presenting an outer lower part of truncated form fitting on said seat, said member having a seal engaging said seat, said member being provided adjacent to the top thereof with a stop surface which abuts the upper stop face of said valve body, a movable obturator, means including a rod extending from said obturator to a location outside said enclosure for controlling the movement of said obturator, a heavy stopper for obturating said enclosure opening, said stopper having an axially extending housing and passage through which said controlling means extends, and a static cross-piece for securing said stopper to said member, said cross-piece having an upper surface cooperating with the lower surface of said stopper.

2. An assembly as in claim 1 in which said upper surface of said cross-piece and said lower surface of said stopper are spherical.

3. An assembly as in any one of claims 1 and 2 in which said enclosure opening is formed with a shoulder and in which said member positioning means comprises a sleeve welded to said member, said sleeve being disposed in said opening with an upper portion thereof abutting said shoulder.

* * * * *